(12) United States Patent
Tsai et al.

(10) Patent No.: US 8,353,634 B2
(45) Date of Patent: Jan. 15, 2013

(54) MOUNTING A PLANAR LIGHT WAVE CIRCUIT IN A HOUSING

(75) Inventors: Tsung-Ein Tsai, San Jose, CA (US); William Wong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1966 days.

(21) Appl. No.: 10/455,947

(22) Filed: Jun. 6, 2003

(65) Prior Publication Data

US 2004/0247258 A1 Dec. 9, 2004

(51) Int. Cl.
*G02B 6/00* (2006.01)
*G02B 6/36* (2006.01)

(52) U.S. Cl. .......... 385/92; 385/137; 385/147; 362/368

(58) Field of Classification Search .................. 385/92, 385/137, 147, 14; 362/368
See application file for complete search history.

(56) References Cited

U.S. PATENT DOCUMENTS

| | | | |
|---|---|---|---|
| 3,094,957 A * | 6/1963 | Knauf, Jr. ................ 269/40 |
| 4,733,932 A | 3/1988 | Frenkel et al. | |
| 5,919,383 A | 7/1999 | Beguin et al. | |
| 6,052,498 A | 4/2000 | Paniccia | |
| 6,553,840 B2 * | 4/2003 | Fournier et al. ................ 73/718 |
| 6,568,074 B1 * | 5/2003 | Shahid ............................ 29/850 |
| 2001/0043778 A1 * | 11/2001 | Griffis et al. .................... 385/76 |
| 2002/0018625 A1 * | 2/2002 | Grann et al. .................... 385/88 |
| 2002/0018635 A1 | 2/2002 | Hsieh et al. | |
| 2004/0248425 A1 * | 12/2004 | Bem et al. ..................... 438/758 |

FOREIGN PATENT DOCUMENTS

| | | |
|---|---|---|
| EP | 1 239 310 | 2/2004 |
| JP | 2000-391179 | 5/2000 |

OTHER PUBLICATIONS

German Patent Office, Office Action for corresponding German Application No. 11 2004 000 996.0-51, 6 Pgs., Jun. 19, 2008.

* cited by examiner

*Primary Examiner* — Charlie Peng
*Assistant Examiner* — Mary El Shammaa
(74) *Attorney, Agent, or Firm* — Trop, Pruner & Hu, P.C.

(57) ABSTRACT

A planar light circuit may be mounted in the housing a one-point mounting. The one-point mounting may reduce the tendency of thermal deformations in the housing to be transmitted to the planar light circuit.

14 Claims, 2 Drawing Sheets

MOUNTING A PLANAR LIGHT WAVE CIRCUIT IN A HOUSING

BACKGROUND

This invention relates generally to planar light wave circuits.

Planar light wave circuits are optical circuits that may be formed using conventional integrated circuit techniques.

Optical components are generally mounted in aluminum housings that may be temperature tuned. Aluminum is light weight and has good mechanical properties. To reduce heater power ratings, plastic housings have been suggested.

However, deformation in plastic housings has been observed after machining. Mounting a planar light circuit on any non-flat surface of the housing may then become a problem.

Thus, there is a need for better ways to mount planar light circuits in housings.

DETAILED DESCRIPTION

Figure 1:
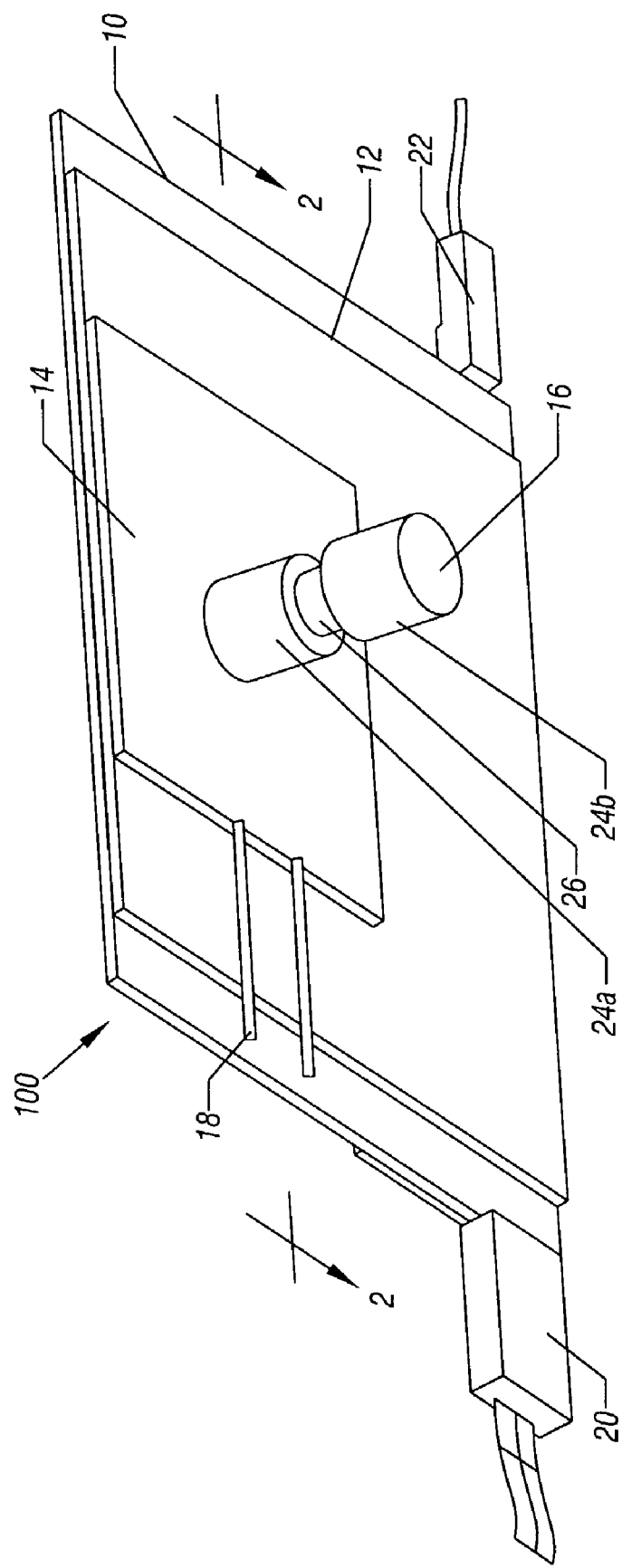
FIG. 1 is a perspective view of one embodiment of the present invention.

Referring to FIG. 1, a planar light circuit module 100 may include a planar light circuit 10, a heat spreader 12, a heater 14, and a one-point heater support 16 in accordance with one embodiment of the present invention. The planar light circuit 10 is an optical circuit formed on a semiconductor substrate using integrated circuit fabrication techniques. The heater 14 is used to change optical characteristics of a component, such as a thermo-optic switch. The heater 14 may change the refractive index of a material. The heat spreader 12 spreads the heat from the heater 14 over a greater area of the circuit 10.

The heater 14 may be coupled by metallizations 18 to a source of power. In some embodiments the heater 14 may be formed of a more resistive material and the metallizations may be formed of a less resistive material. Optical and electrical signals may be coupled to the planar light circuit 10 through couplers 20 and 22.

Figure 2:
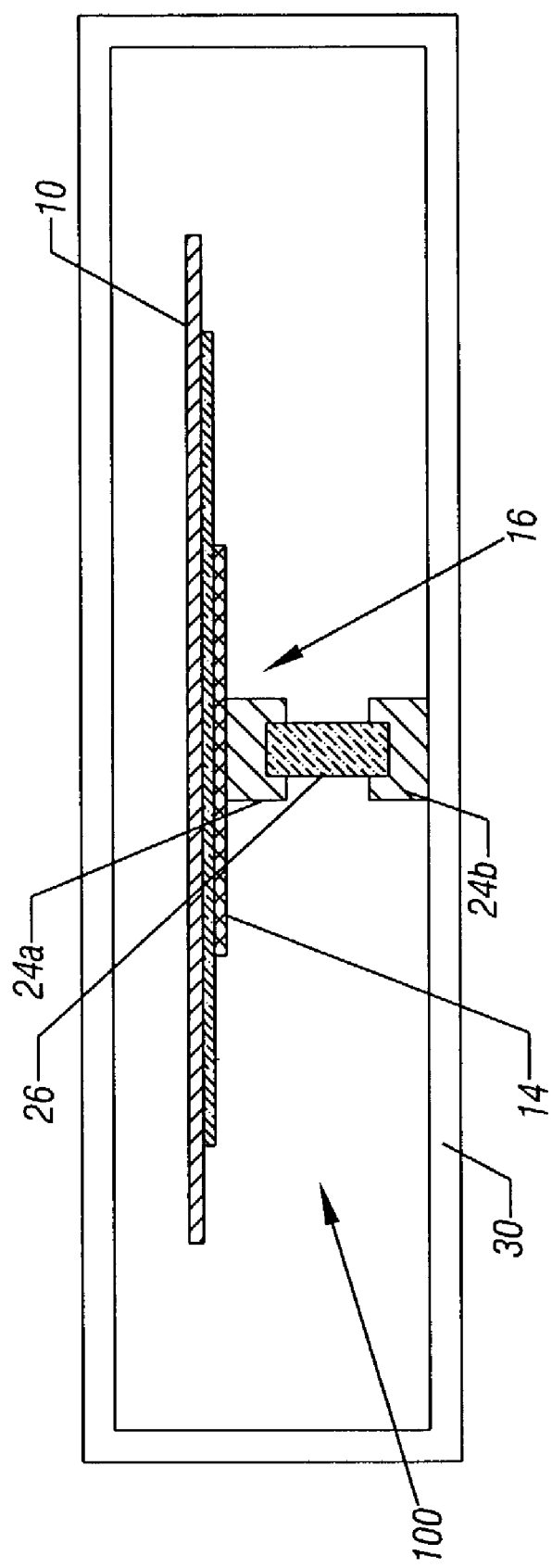
FIG. 2 is a cross-sectional view taken generally along the line 2-2 in FIG. 1 after the device has been placed in a housing in accordance with one embodiment of the present invention.

The one-point heater support 16 may include an upper enlarged end 24a, a lower enlarged end 24b, and a reduced diameter intermediate portion 26, which couples the enlarged ends 24a and 24b. As shown in FIG. 2, the enlarged end 24b may be mounted on a lower support surface of a housing 30. In one embodiment, the housing 30 may be a plastic housing. The intermediate portion 26 may be telescopically plugged into appropriate openings in the upper and lower enlarged portions 24a and 24b. The portions 24 and the ends 24 may be tubular in one embodiment, having a round external surface.

Through the use of single point mounting, thermal deformation of the housing 30 may not distort the planar light circuit 10 in one embodiment. For example, in a multi-point mounting system, if the housing distorts between the two points of connection to a planar light circuit, the planar light circuit would be similarly distorted. Such distortions may modify characteristics of light signals associated with the circuit 10.

In one embodiment of the present invention, the upper enlarged end 24a may be secured to the heater 14, for example by glue. The end 24a may have a coefficient of thermal expansion similar to that of the circuit 10 in one embodiment. The lower enlarged end 24b may have a coefficient of thermal expansion similar to that of the housing 30 in one embodiment.

As a result of the matched coefficients of thermal expansion, thermal stress may be reduced between both attaching points represented by the enlarged ends 24a and 24b. Relative motion may be possible between the ends 24 and the intermediate portion 26. For example, the portion 26 may telescope into and out of the ends 24 in one embodiment. Thus, the joints between the ends 24 and the portion 26 may be stress relieving. The portion 26 may also be softer than the ends 24 in one embodiment. With a one-point mounting, stress transfer to the circuit 10 may be reduced even when the housing 30 is deformed, for example by heating.

In some embodiments, the environmental thermal load may be reduced through the use of a housing 30 that is made of plastic and one-point mounting. The thermal gradient of the planar light circuit 10 is accordingly smaller in some embodiments, thereby reducing the refractive index variation due to thermal stress. With reduced thermal stress on the planar light circuit 10, the test failure rate can also be reduced in some cases.

In addition, deformation stress due to the housing 30 may be reduced with one-point mounting in some embodiments. The yield of the packaged planar light circuit devices may then be increased. Mechanical stress perturbations on the planar light circuit 10 may be reduced by reducing mechanical induced stress on the packaged module 100.

In some embodiments, the mounting of the planar light circuit 10 may be simplified using the one-point mounting. By using round, telescoping components 24 and 26, a socket mounting may be achieved in some embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A device comprising:
   a planar light circuit;
   a housing for said planar light circuit;
   a one-point mounting of said planar light circuit on said housing; and
   a pair of portions, each coupled to one of said housing and said circuit, wherein said portions being coupled by a connector for relative motion between said connector and said portions, wherein said portions receive said connector telescopically.

2. The device of claim 1 wherein said housing is made of plastic.

3. The device of claim 1 wherein said mounting includes a first portion coupled to said circuit, said first portion having a coefficient of thermal expansion matched to that of said circuit.

4. The device of claim 1 wherein said mounting includes a portion coupled to said housing, said portion having a coefficient of thermal expansion matched to that of said housing.

5. The device of claim 1 wherein said portions and said connector are tubular.

6. The device of claim 5 wherein one of said portions has a coefficient of thermal expansion matching the coefficient of thermal expansion of said circuit and the other of said portions has a coefficient of thermal expansion matching the coefficient of thermal expansion of said housing.

7. The device of claim 6 including a heater on said circuit, wherein one of said portions is coupled to said heater.

8. The device of claim 7 including a heat spreader coupled to said heater.

9. A method comprising:
   mounting a planar light circuit on a housing a centrally mounted post, said circuit being unsupported over the entirely of its surface outbound of the post;
   mounting said circuit on a one-point mounting that includes a first portion that matches the coefficient of thermal expansion of said housing and a second portion that matches the coefficient of thermal expansion of said circuit; and
   connecting said portions through a connector which telescopes within said first and second portions.

10. The method of claim 9 including using a one-point mounting that allows relative motion between said circuit and said housing.

11. The method of claim 9 including mounting said circuit in a plastic housing.

12. The method of claim 9 including mounting said circuit on a one-point mounting that includes a portion that matches the coefficient of thermal expansion of said circuit.

13. The method of claim 9 including mounting said circuit on one-point mounting that includes a portion that matches the coefficient of thermal expansion of said housing.

14. The method of claim 9 including using a one-point mounting which is tubular.

\* \* \* \* \*